United States Patent
Rajanna

(10) Patent No.: US 10,033,860 B2
(45) Date of Patent: Jul. 24, 2018

(54) SYSTEM AND METHOD FOR PROVIDING CONTEXTUAL INFORMATION ABOUT THE CALLER TO MAKE THE CONVERSATION MEANINGFUL

(71) Applicant: Pooran Prasad Rajanna, Davanagere (IN)

(72) Inventor: Pooran Prasad Rajanna, Davanagere (IN)

( * ) Notice: Subject to any disclaimer, the term of this patent is extended or adjusted under 35 U.S.C. 154(b) by 0 days.

(21) Appl. No.: 14/891,124

(22) PCT Filed: May 13, 2014

(86) PCT No.: PCT/IB2014/061395
§ 371 (c)(1),
(2) Date: Nov. 13, 2015

(87) PCT Pub. No.: WO2014/184733
PCT Pub. Date: Nov. 20, 2014

(65) Prior Publication Data
US 2016/0072946 A1  Mar. 10, 2016

(30) Foreign Application Priority Data

May 13, 2013 (IN) .......................... 2120/CHE/2013

(51) Int. Cl.
*H04M 3/42* (2006.01)
*H04W 4/16* (2009.01)

(52) U.S. Cl.
CPC ......... *H04M 3/42042* (2013.01); *H04W 4/16* (2013.01)

(58) Field of Classification Search
CPC ......... H04W 4/16; H04W 4/02; H04W 4/001; H04W 36/0022
See application file for complete search history.

(56) References Cited

U.S. PATENT DOCUMENTS

| | | | |
|---|---|---|---|
| 8,914,850 B1 * | 12/2014 | Mateer | H04M 3/493 726/4 |
| 2003/0065768 A1 | 4/2003 | Malik | |
| 2007/0105589 A1 * | 5/2007 | Lu | H04W 88/02 455/556.2 |
| 2007/0239685 A1 | 10/2007 | Howell et al. | |
| 2008/0189360 A1 | 8/2008 | Kiley et al. | |
| 2014/0161241 A1 * | 6/2014 | Baranovsky | H04M 3/51 379/142.05 |
| 2014/0279514 A1 * | 9/2014 | Sharp | G06Q 20/40145 705/44 |

* cited by examiner

*Primary Examiner* — Khalid Shaheed
(74) *Attorney, Agent, or Firm* — Avery N. Goldstein; Blue Filament Law PLLC

(57) ABSTRACT

The present invention relates to a system and method for providing contextual information about the individual to make the conversation meaningful. For this purpose, the system comprises a device for receiving call from the individual, an external system for collecting information from various third party Information Service Providers like Email servers, Social Networks, Enterprise Software Solutions, Content Websites, Search services, Directory services, etc., for which the user who is being called has given access to and provides to the user the collected relevant information in a form so as to have a meaningful conversation with the individual. The system also saves the conversation discussed over the call once the call is disconnected.

4 Claims, 7 Drawing Sheets

SYSTEM AND METHOD FOR PROVIDING CONTEXTUAL INFORMATION ABOUT THE CALLER TO MAKE THE CONVERSATION MEANINGFUL

TECHNICAL FIELD OF THE INVENTION

The present invention relates to a system and method for providing contextual information to the user about the individual or the person user who is calling, so that the user can have a meaningful conversation.

BACKGROUND OF THE INVENTION

Generally during business calls, 70% of the time by looking up for the individual information in mails, web and other relevant sources to make the conversation useful. For instance, in a typical sales department, when a prospect or client calls the sales personnel, the sales personnel who is handling the call needs to be aware of whether the prospect or client had already made call to him, if so what was the previous conversation, the previous transaction history, discounts offered to the prospect or client, etc., so as to make the conversation useful. But for this purpose, the sales personnel have to go through many records, applications, and websites manually to collect relevant information regarding the prospect or client.

Hence what is needed is a system which is capable of identifying the individual and is capable of retrieving relevant information required in order to save time and to make conversation useful.

Also there exists a need for the sales personal (user) to know the recent professional and personal activities of their clients (individual/multiple participants) so as to have a personalized touch with their clients (individual/multiple participants).

Also there exists a need of saving information of all conversations taking place between the sales personnel (user) and the prospect or client (individual/multiple participants) so that even if the sales personnel (user) leaves the company/organization someone else can take over the prospect or client (individual/multiple participants) using the saved information.

Also there exists a need of saving all conversations taking place between the sales personnel (user) and the prospect or client (individual/multiple participants) so that even if the sales personnel (user) leaves the company/organization someone else can take over the prospect or client (individual/multiple participants).

Also there exists a need for the sales personal (user) to know the recent professional and personal activities of their clients (individual) so as to have a personalized touch with their clients (individual).

SUMMARY OF THE INVENTION

Methods and systems are described for providing contextual information to the user about the individual or individual of a call.

The method of the present invention may be implemented on any mobile telephone, any phone of any operating system, any tablet computer of any operating system, any type of computers of any operating system, Mac, Smart TVs, any Wearable devices like smart watches, wearable glass etc., or any computing device used in any department in any office, hospital care management, customer care centers, banking sectors etc., so as to minimize the time of the common user or a customer care personnel or a sales care personnel wasted in searching records manually. The end user can also be anybody with internet connected phone and other devices, where at least one or more Third party Information Service Providers are configured to find necessary information about the individual or the individual of the call. The details of one or more embodiments of the invention are set forth in the accompanying drawings and the description below. Other features and advantages of the invention will become apparent from the description, the drawings, and the claims.

The present invention provides a system or an application that identifies the individual when a call is placed on the mobile device and retrieves relevant information required for making the conversation meaningful. For this purpose, the system comprises an external system for retrieving relevant information related to the individual from various Third Party information Service Providers like Email servers, Social Networks, Enterprise Software Solutions, Content Websites, Search services, Directory services, etc., and organizing them in a user consumable format. This system will help them consume all these information on the mobile device or any of the pre-registered secondary devices, so that they don't have to rummage through myriad of applications and websites to go through, and have a meaningful conversation. The relevant information about the individual includes, but not restricted to, the individuals/multiple participants' recent activities, mails exchanged with the user, past discussions logged in any of the Third party Information Service Providers 204, 404, social activities like posts, tweets, information about the individual/multiple participants company information, recent market data, recent news about the information sources company, etc.

The system of the present invention also prompts the user to save the conversation discussed over the call once the call is disconnected so that next time when the same individual places the call, the system shows the updated information about the individual too. Also depending on the type of access to Third Party Information Service Servers, the user has provided to the system, the prompt to the user can show one or more tasks that are exposed by Third party information source provider, so that user can record the discussion on the Third party information source provider's system.

The device of the present invention may be any phone of any operating system, any tablet computer of any operating system, any type of computers of any operating system, Mac, Smart TVs, any Wearable devices like smart watches, wearable glass etc., a generic purpose computer, a specific purpose computer or any computing device with a display screen, accepts push notifications, and is connected to internet.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE INVENTION

Figure 1:
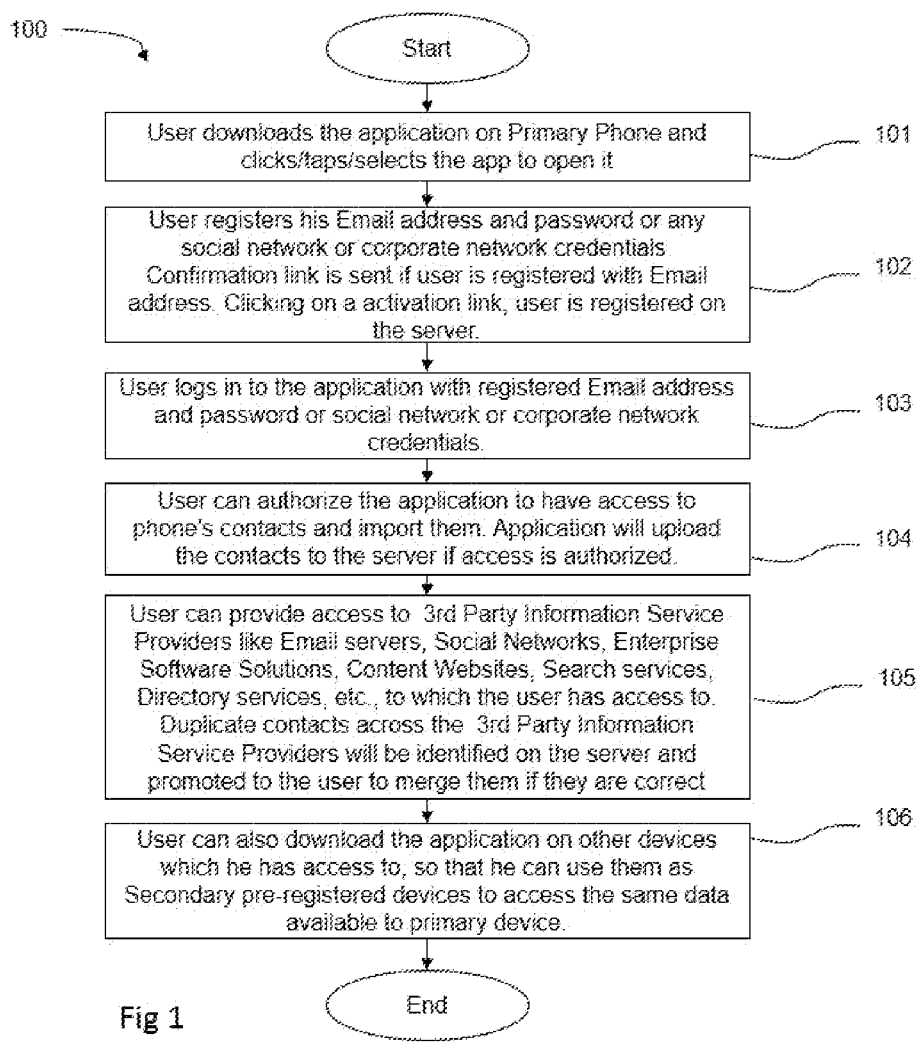
FIG. 1 is a flowchart that details steps involved in user signing up for the application, permission to import contacts, importing contacts, user providing application to data on various Third party Information Service Providers.
Figure 2:
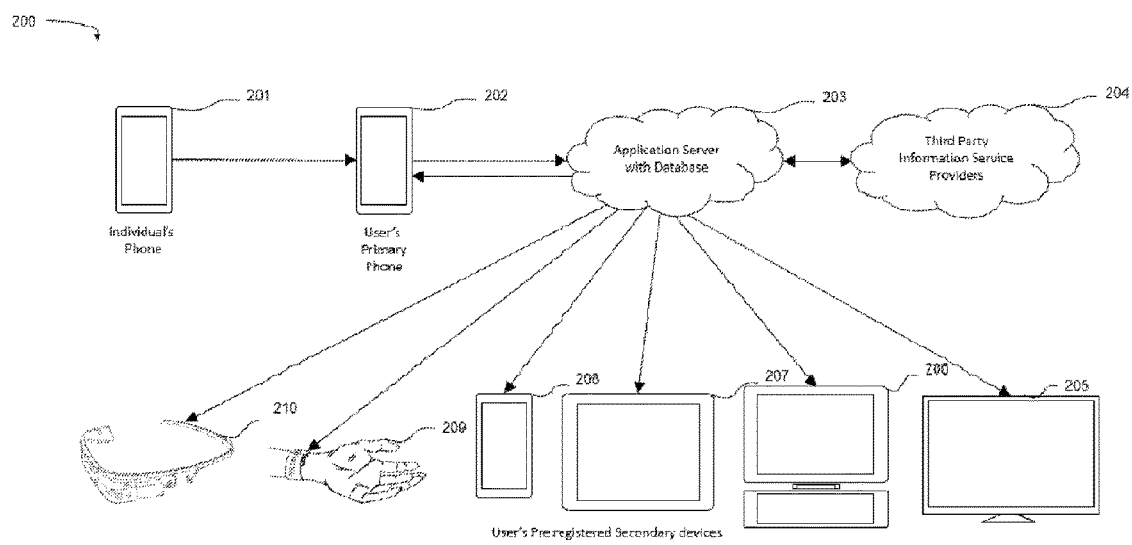
FIG. 2 is a schematic illustration of a system for implementing the present invention, including required systems and their interaction when user of the application receives the call from individual's phone.
Figure 3:
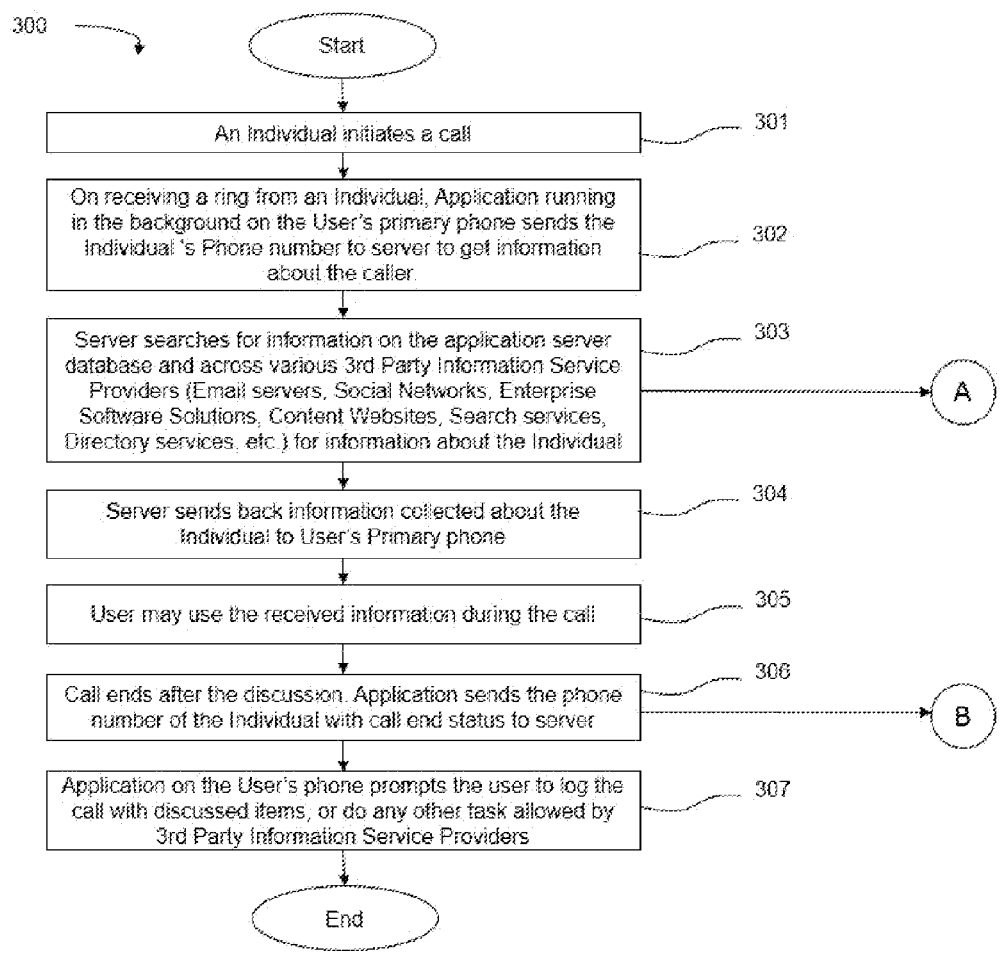
FIG. 3 is a flowchart that details steps of functioning of the present invention when user of the application receives the call from individual's phone.
Figure 4:
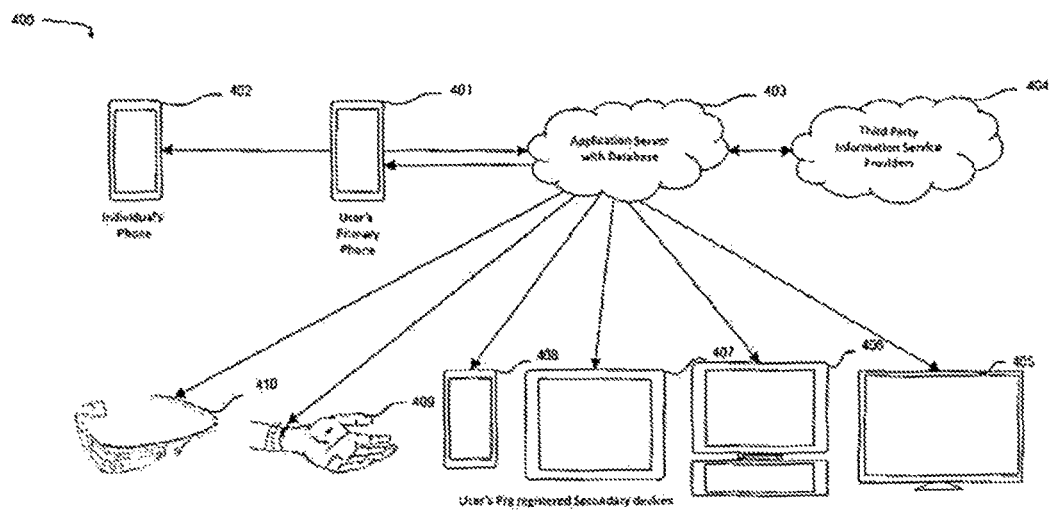
FIG. 4 is a schematic illustration of a system for implementing the present invention, including required systems and their interaction when user of the application places the call to the individual's phone.
Figure 5:
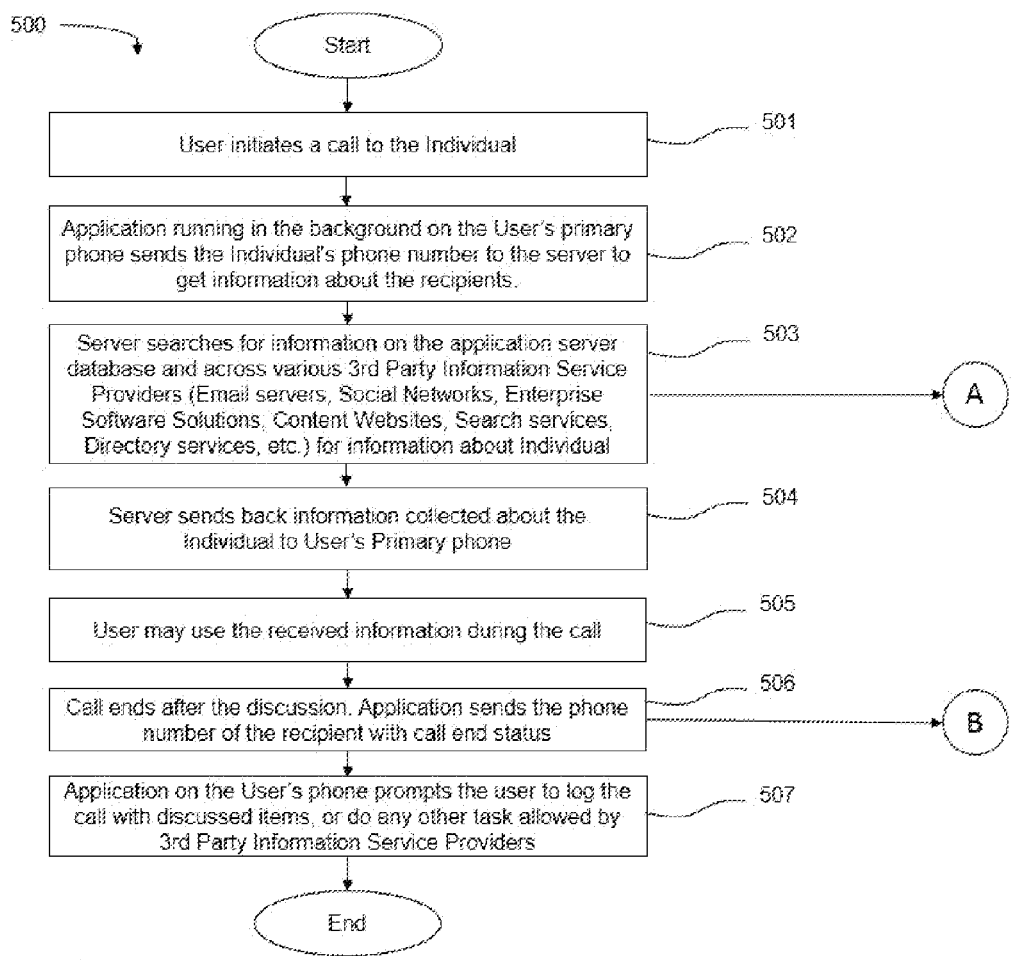
FIG. 5 is a flowchart that details steps of functioning of the present invention when user of the application places the call to individual's phone.
Figure 6:
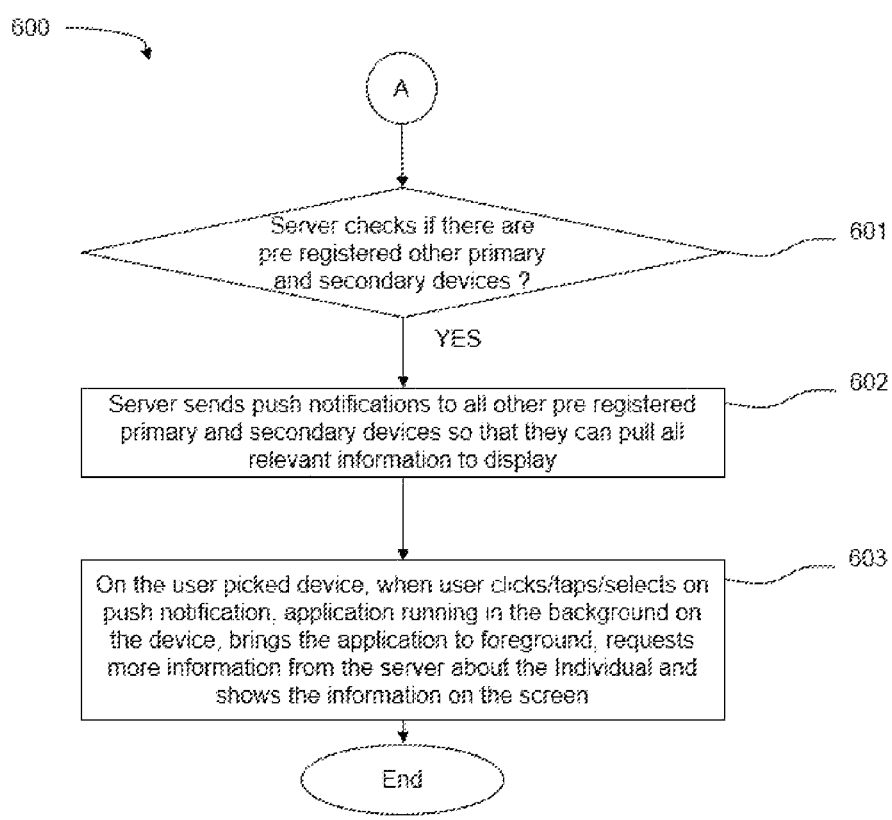
FIG. 6 is a flowchart that details additional steps of functioning FIG. 2 and FIG. 4.
Figure 7:
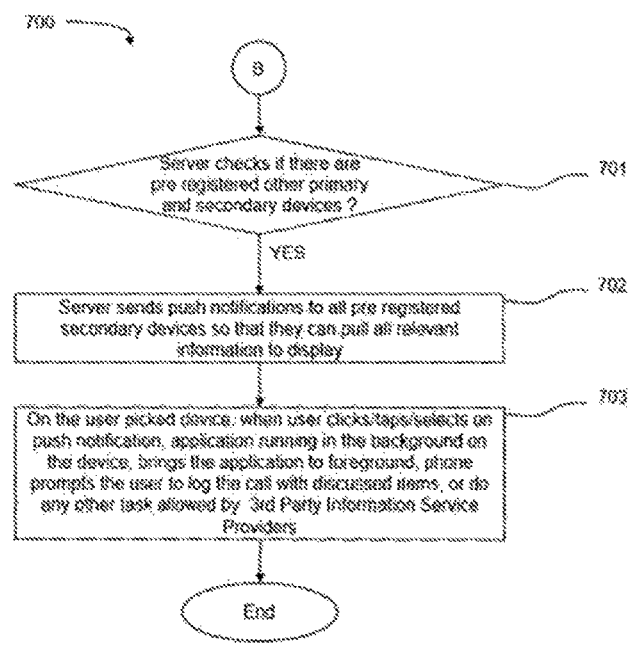
FIG. 7 is a flowchart that details additional steps of functioning FIG. 2 and FIG. 4.

As shown in FIG. 1, the system Step 100 shows the flow of the user registration and configuring the application. User downloads and installs the application Step 101 on the user's device 202, 401, 205, 206, 207, 208, 209, 210, 405, 406, 407, 408, 409, 410 as represented in FIG. 2 and FIG. 4 respectively, and clicks/taps/selects the application to open it.

In the system Step 100 the application, if the user is a new user prompts Step 102 him to sign up using email address and password or using any social network or corporate network credentials. If user registers with email address and password, a confirmation link will be sent to the email address. User can click the link to activate the account and register on the server 203, 403.

User can login to the application with registered email address and password or signed up social network or corporate network credentials Step 103.

Once logged in Step 104, user can authorize the system or the application Step 100 to access and import them. Given access, the system or the application Step 100 will upload the phone contacts to the server 203, 403.

User can provide access Step 105 to Third Party Information Service Providers 204, 404 like Email servers, Social Networks, Enterprise Software Solutions, Content Websites, Search services, Directory services, etc., to which the user has access to. Duplicate contacts across the Third Party Information Service Providers 204, 404 will be identified on the server 203, 403 and promoted to the user to merge them if they are correct.

If the User has more than one device on which one wants to see the contextual information on, user can download and install the system or the application Step 106 (similar to Step 100, built for that device) on other devices, may be any phone of any operating system, any tablet computer of any operating system, any type of computers of any operating system, Mac, Smart TVs, any Wearable devices like smart watches, wearable glass etc., a generic purpose computer, a specific purpose computer or any computing device with a display screen, accepts push notifications, and is connected to internet 205, 206, 207, 208, 209, 210, 405, 406, 407, 408, 409, 410. User can set any of the device that allows the system or the application Step 100 to listen to incoming, outgoing and call end states and allows access to incoming or outgoing phone number, as Primary Phone 202, 401. Any device that does not allow the system or the application Step 100 to listen to incoming, outgoing and call end states and allows access to incoming or outgoing phone number as Secondary device 205, 206, 207, 208, 209, 210, 405, 406, 407, 408, 409, 410.

There can be many Primary Phones 202, 401 and. Secondary Devices 205, 206, 207, 208, 209, 210, 405, 406, 407, 408, 409, 410 registered by the user, and user has to login Step 103 to all these devices with the credentials registered with the server 203,403. All primary and secondary devices 202, 401, 205, 206, 207, 208, 209, 210, 405, 406, 407, 408, 409, 410 must allow Push notifications to arrive from server 203, 403.

As shown in FIG. 2, when an individual, using his phone 201 calls Step 301 the user's Primary phone 202 or as shown in FIG. 4, when the User using his Primary Phone 401, calls Step 501 the individual's phone 402, the system or the application running in the background captures Step 302, Step 502 the phone number of individual's phone 201 or the individual's phone number 402, and sends it to the server 203, 403. Server 203,403 searches Step 303, Step 503 its database to identify the individual/individual and if information is found, it will further search for information on Third Party Information Service Providers 204, 404 for more information on the individual/individual and sends back the collected information Step 304, Step 504 to the primary phone 202, 404 so that user can know about individual/multiple participants' recent activities, mails exchanged with the user, past discussions logged in any of the Third party Information Service Providers 204, 404, social activities like posts, tweets, information about the individual/multiple participants' company information, recent market data, recent news about the company, etc. If the phone number does not match any user in the server 203,403 or Third Party Information Service Providers 204, 404, server 203,403 sends back information saying it is a new number, to the user's primary phone Step 304, Step 504.

If there are more Step 601 pre-registered primary or secondary devices 205, 206, 207, 208, 209, 210, 405, 406, 407, 408, 409, 410 apart from 202, 401, server 203, 403 sends push notifications Step 602 to all the devices indicating an incoming or outgoing call. On the user picked device, when user clicks/taps/selects on push notification Step 603, the system or the application Step 100 running in the background on the device, brings the application to foreground, and requests more information from the server 203,403 about the individual and shows the information. The information shown in Step 304 is similar to Step 603. The display of the content may vary depending on the device size, resolution.

User can use Step 305, Step 505 the information provided Step 304, Step 504 by server 203,403 during the call to have a meaningful conversation with the individual/multiple participants.

When the call ends or either party disconnects the phone, the system or the application will also send Step 306, Step 506 the phone number of the individual/multiple participants phone 201, 402, to the server 203, 403. If there are more Step 701 pre-registered primary or secondary devices 205, 206, 207, 208, 209, 210, 405, 406, 407, 408, 409, 410 apart from 202, 401, server 203, 403 sends push notifications to all the devices indicating an call end status Step 702 with the phone number. The system or the application Step 100 on the User's primary phone will prompts Step 307, Step 507 the user to log the call with discussed items, or do any other task allowed by Third Party Information Service Providers 204, 404.

On the user picked device, when user clicks/taps/selects on push notification Step 703, the system or the application Step 100 running in the background on the device, brings the application to foreground, phone prompts the user to log the call with discussed items, or do any other task allowed by Third Party Information Service Providers 204, 404.

I claim:

1. A method for providing contextual information about the individual to make the conversation meaningful, the method comprising the steps of:
   a) detecting at the mobile device, an incoming call from an individual or outgoing call to the individual, collecting the phone number of the incoming or outgoing call;
   b) sending the collected phone number to the server to identify the individual;
   c) searching for the information about the individual on the application server database and across third party information service providers which user has shared access to email servers, social networks, enterprise software solutions, content websites, search services, directory services and curating it for sending back the data;
   d) sending the curated content to the mobile device for displaying and mobile device displaying the content;
   e) sending a push notification indicating an incoming or outgoing call notification to all pre-registered devices of the user;
   f) showing the curated content on the selected pre-registered device after responding to the incoming push notification;
   g) user using the information provided on the screen rather than searching in various third party information service providers and applications for the information;
   h) sending push notification to all other pre-registered devices notifying of the call;
   i) choosing one or more pre-registered mobile devices to act on the push notification by the user, and application fetching the information for the user to read; and
   j) on completion of the call, user getting a push notification on all pre-registered devices, notifying the end of call, acting upon which, the user is prompted to log a call or perform any action as allowed by third party information service providers.

2. The method of claim 1, where user registers all devices with the application with permission to receive push notifications, so that user gets notified on incoming calls, outgoing calls and call end events, and the user uses a primary device for making and receiving calls or a primary or secondary device for reading the curated information.

3. The method of claim 1, wherein the method further comprises the steps of sending notifications to the primary phone and secondary devices about the incoming, outgoing or call ending status, so that user can access the information about the person he/she is having a call with, on any device the user has access to or comfortable with during the call.

4. The method of claim 1, wherein the method further comprises the steps of: a) identifying and presenting the task allowed by the third party information source provider, in a format that is shown to the user; and b) submitting the content back to the third party information source provider.

* * * * *